DENNIS G. LITTLEFIELD.

Improvement in Grates.

No. 4,586. Reissued Oct. 10, 1871.

Witnesses:
W. P. Stacpole.
Chas. S. Collins

Inventor:
Dennis G. Littlefield

THE NORRIS PETERS CO., PHOTO-LITHO., WASHINGTON, D. C.

UNITED STATES PATENT OFFICE.

DENNIS G. LITTLEFIELD, OF ALBANY, NEW YORK.

IMPROVEMENT IN GRATES.

Specification forming part of Letters Patent No. 30,333, dated October 9, 1860; antedated July 3, 1860; reissue No. 1,303, dated April 22, 1862; reissue No. 4.586, dated October 10, 1871.

DIVISION B.

*To all whom it may concern:*

Be it known that I, DENNIS G. LITTLEFIELD, of the city and county of Albany, in the State of New York, have invented an Improved Grate, which I denominate a "Mill-Grate," of which the following is a specification:

My invention is particularly designed for coal-stoves and furnaces; and has for its object the pulverization of the cinders, slate, and other incombustible matter remaining from the fuel, to an extent sufficient to enable them to fall with the ashes through the interstices of the grate, leaving unobstructed the passages for the supply of air to support the fire; and it consists of a fixed central portion, having radial projections on its surface, combined with a concentric annular portion provided with inwardly-projecting radial bars, the two parts being so connected that the latter may receive a reciprocating or vibratory motion around the former.

Figure 1:
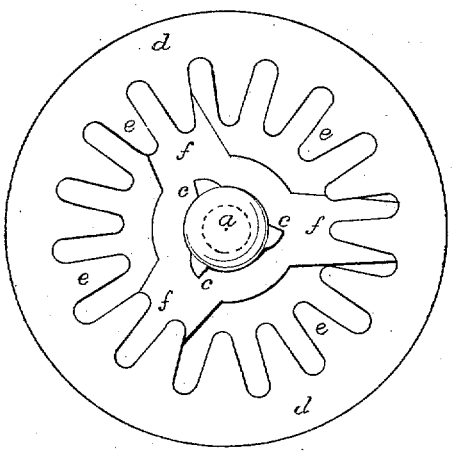
Figure 2:
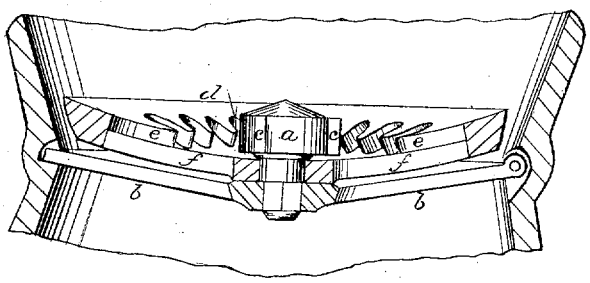

Figure 1 is a plan view, and Fig. 2 a sectional view of my improvement.

As represented in the drawing a small central hub, *a*, is fixed in the sustaining-bar *b*, and is provided on its periphery with radial projections *c c*, which may be more or less in number and prominence. Surrounding this stationary hub is an annular grate, *d*, concentric with the hub *a*, around which it has a reciprocating movement, being supported by means of the arms *f f* on the bar *b* to which it is pivoted, or it may be sustained on any other suitable bearing. This part is provided with radial bars *e e* projecting inward toward the hub. The grate *d* is vibrated by a lever, inserted in the usual manner. It is made more or less dishing or concave, so that slate or other incombustible matter will, when agitated by the motion given it, gravitate toward the central hub *a*, and be pulverized between the moving bars *e e* and the projections of the fixed hub by a process analogous to that of a grinding-mill. The broken and pulverized portions fall through between the bars of the grate, leaving the surface unobstructed by incombustible matter and admitting a free passage of air through the fuel. The hub *a* is preferably of such thickness vertically as to elevate it above the surface of the bars *e*, and its top may be of conical form with advantage, to prevent the lodgment of any substance thereon.

I claim as my invention—

The mill-grate, constructed and operating substantially as and for the purpose described.

DENNIS G. LITTLEFIELD.

Witnesses:

CHAS. S. COLLINS,
H. P. STACKPOLE.